United States Patent Office 3,070,007
Patented Dec. 25, 1962

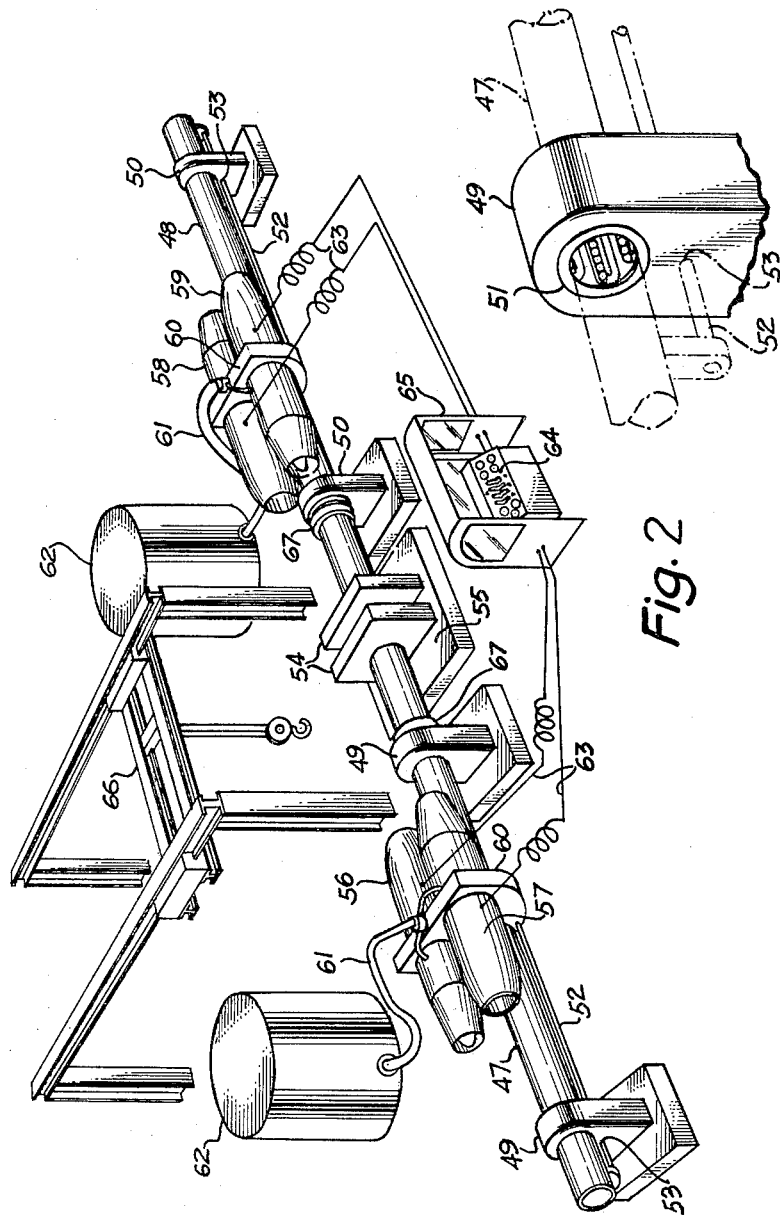

3,070,007
JET PRESS
Harry A. Toulmin, Jr., Dayton, Ohio, assignor to The Commonwealth Engineering Company of Ohio, Dayton, Ohio
Filed May 28, 1959, Ser. No. 816,432
13 Claims. (Cl. 100—264)

The present invention relates to an improved press, more particularly, to a wholly new concept of press construction and operation comprising a vertical or horizontal press operated by reaction propulsion means, such as turbo jets or the like.

Conventional presses may be operated by hydraulic or mechanical power. It is the main purpose of a press, regardless of its mode of operation, to produce a controlled thrust at a controlled speed upon an object with the purpose of changing the shape, density or structure thereof.

It is axiomatic in classical mechanics that whenever a thrust is being exerted upon an object, there is an equivalent reaction upon the thrust exerting means which must be absorbed by an adequate mechanical structure. Moreover, when the thrust is exerted at appreciable velocity, there will be kinetic energy stored in the thrust exerting means which must be absorbed by suitable means. For this reason we find that all conventional presses, hydraulic or mechanical, comprise very heavy structures, consisting of a base or bed, designed of sufficient strength and weight to absorb the bending moment to which they are subjected. Upon this bed the object is placed whose shape or density is to be changed—usualy by confining it in suitable dies or molds.

The means that develop the thrust or force on the object may be a traveling ram or platen, mounted reciprocally in guides to keep it in lateral alignment. It is now necessary in a conventional press to provide means to absorb the reaction force of the ram or platen, and to this end a structure is required which must be as heavy as the structure upon which the work piece is mounted. This structure must be connected to the bed of the press by means of tie rods, and these tie rods must be of sufficient strength to absorb the thrust of the press, or its reaction, respectively.

The fact that the thrust and its reaction are concentrated in the center of the bed and the reaction member, while the tieing means are of necessity spaced a distance away from the center causes a bending stress to exist in both the bed and reaction member which is over and above that produced by the mere compressive stress in bed and reaction member. This in turn leads to the necessity of having very heavy members to resist these bending stresses, plus the tieing means that must also be heavy to carry the thrust reaction which is equal to the thrust itself.

These limitations are inherent in conventional presses of both the mechanical and hydraulic variety. The static reaction to the press thrust is resisted by the reaction member, which is in turn tied to the thrust member by the tie rods, which take the force existing between both. Thus it will be necessary to provide a heavy bed structure having several times the weight of a simple compressive structure to reduce the bending stresses to an acceptable value. In addition, a head structure is required of equal strength and weight. Added to this are the tie rods, which must have a section to withstand the full thrust of the press in tension. The above-mentioned characteristics are common to both hydraulic and mechanical presses. Specific characteristics of either mode of operation will now be discussed, insofar as they bear upon the subject of this invention.

For most press working operations a constant linear speed has been found desirable. It has been established that a speed of about 30 feet per minute is most economical for pressed metal work, which comprises the bulk of the press applications where most press equipment is sold. Speeds in excess of this may be damaging to the work piece and cause an excessive amount of scrap, while speed below this figure would be uneconomical in view of the reduced production. Conventional mechanical and hydraulic presses fall short of achieving this ideal. In a mechanical press the speed of the ram is sinusoidal, varying from zero at top dead center to a maximum in mid-stroke and back to zero at the bottom of the stroke. Added to this is the fact that the force or thrust obtainable from a mechanical press is also a function of its stroke location, being a maximum at the bottom of the stroke and a minimum in mid stroke. The selection of a mechanical press for a given job therefore represents a compromise. The press must be of sufficient strength to supply the required force in mid-stroke, which will result in a press heavier and costlier than would be required if a steady constant thrust were available over the full length of the stroke. The speed of the press must be so chosen that the practical maximum is not exceeded in mid-stroke. Thus, the over-all speed of the press must be slowed down, and this reduction in speed results in loss of production.

In a hydraulic press another problem presents itself. Hydraulic presses have the advantage that they supply a constant and steady speed as well as full thrust capacity—if required—throughout the entire stroke range. The problem lies in providing sufficient power capacity at reasonable economy to operate the press at the optimum speed established for the pressing operation. The following example will illustrate this. Assume that it is desired to operate a 1000-ton press at the optimum speed of 30 feet per minute. Then, at the customarily used hydraulic working pressure of about 2,500 lbs. per sq.in., a flow of hydraulic fluid of over 1200 gallons per minute would be required. This would involve a hydraulic power system of a capacity of two thousand horse-power and pumping equipment costing upward of one hundred thousand dollars. Eight-inch-high pressure piping would be required to convey the flow of fluid. Since such an arrangement would be far too high in cost of acquisition, and too bulky and elaborate in relationship to the press equipment on which it would be used, resort is generally made to a compromise whereby speeds considerably lower than those required for optimum performance are accepted in order to hold the initial investment to a more reasonable figure. Even with these limitations, a hydraulic press is a complicated piece of equipment having an elaborate hydraulic power generating and control system. Both the mechanical and hydraulic press depend upon for their operation an external source of primary power which is electric current. This current is supplied through the power mains from a distantly located central station. If this central station supply is cut off, such as by enemy action in war time, then either of the two conventional presses will have to cease operation.

The present invention discloses a jet press. This press employs jet propulsion means as a source of power. It essentially comprises a ram which is reciprocally mounted in suitable guides. A platen is secured to one end of the ram and adapted for cooperation with a bolster upon which may be mounted a die. Opposed jet means are then secured to the ram. Controls are provided in order to selectively operate either one of the jets in order to determine the direction of movement of the ram. The specific type of jet employed is immaterial. However, it is pointed out that the jets illustrated in this invention are of the turbo jet type.

The improved jet press may be constructed to operate in either a vertical or a horizontal position. In the former case, when a single ram is employed, the load reaction is transferred through the bolster of the press to the foundation, which must be of sufficient strength to withstand the load reaction. A die cushion may be employed to cooperate with the operation of the ram in certain types of metal working operations. When it is desired to construct a horizontal press employing the teaching of this invention, a pair of axially aligned horizontally disposed rams are reciprocally mounted on suitable guides. Platens are mounted on adjacent ends of the rams so as to cooperate with each other. A pair of opposed jets are then mounted upon each ram. Suitable controls are provided in order to operate the appropriate jets in order that the rams may move toward each other and away from each other in order to work an object placed therebetween.

It should be noted that in this case, the load reaction between the two sets of jets is completely self-contained and no forces of any kind are transmitted to the foundation. The same opposed-jet principle could also be applied to a vertical press, in which case a heavy foundation could be eliminated which otherwise would be required with the use of a single pair of jets.

This invention is directed to the use of a jet principle to a press, and it is to be understood that the jet principle may be satisfactorily used in other forms of apparatus. The jet principle may be successfully applied to apparatus for metal forming, plastic injection, plastic compression molding, die casting, and the like. One jet is operated to bring the platen down upon the object to be worked, and at the end of the working stroke the oppositely directed jet is operated in order to return the platen into position in order to begin another working stroke. The operator of the press is carefully shielded in order to protect him from the blast from the jets. Fuel for the operation of the jets may be stored in separate tanks with lines leading to the jets or any other suitable or convenient location. The advantages of the jet press of this invention and the results which can be achieved by this jet press may be summarized as follows:

(1) A completely different principle of absorbing the reaction load of the thrust exerting member is used. The thrust is produced within the jet motor and the thrust reaction is absorbed by the mass of the gases developed thereing. Therefore, no mechanical reaction member and no tieing means to the bed of the press are required. This not only eliminates the head beam and lightens the guide rods so that the rods are purely guiding means and are not subjected to any longitudinal stress, but—what is equally important—the bending stresses on the base are eliminated.

(2) By mounting two opposed pairs of jets, either on a horizontal or vertical press, all reaction to the foundation, both statically and dynamically, is avoided, so that a very light, or even an improvised foundation, may be provided instead of the heavy foundations customarily used for this type of equipment.

(3) Both the speed and the thrust can be finely controlled. The thrust is constant and the speed is linear, providing optimum working conditions at the maximum speed feasible for proper production of the work.

(4) Controls for the jet units are simple and the only external connections necessary are fuel lines and electrical control cables, thus eliminating the mass of hydraulic lines and control valves necessary on the conventional hydraulic press and the multiplicity of gearing, shafts and flywheels employed on a conventional mechanical press.

Such a simplification of the press structure is a substantial advance in the press industry, since such presses will be less expensive and will take less time to manufacture, thus decreasing the time between the placing of an order for a press and the delivery of the assembled press.

(5) Greater production can be obtained from the jet press of this invention because of the greater number of strokes per unit time possible and because of reduced down-time for maintenance since the number of components is greaterly reduced.

(6) The jet press is operated from its own supply of fuel and is less vulnerable to be out of action as it does not depend on an external supply of power that may be denied by enemy action in case of war or by action of the elements or similar causes.

It is therefore the principal object of this invention to apply the jet principle to a press or the like.

It is another object of the invention to provide a press requiring no reaction member for its thrust but providing for the reaction of the working thrust by means inherent in itself.

It is another object of this invention to provide an improved and simplified press.

It is a further object of this invention to provide a high-speed press or the like operated by opposed jets.

It is an additional object of this invention to apply the jet principle to apparatus for metal forming, plastic injection, plastic compressure molding, die casting, and the like.

It is still another object of this invention to provide a simplified but efficient press wherein many of the complicated mechanisms necessary for a conventional hydraulic or mechanical press are eliminated.

It is still a further object of this invention to provide a principle of operation for a press which may be readily adapted to a horizontal or vertical press.

It is still an additional object of this invention to provide a principle of operation for a press whereby neither static nor dynamic stresses are transmitted to the foundation.

It is yet a further object of this invention to provide a novel and improved horizontal press.

Other objects and advantages of this invention will become apparent upon reference to the following description when taken in conjunction with the accompanying drawings, wherein:

FIGURE 1 is an over-all perspective view of a horizontal press employing the jet principle; and FIGURE 2 is an enlarged view of one of the ram supports in FIGURE 1 showing the details of the linear bearing mounted therein.

Proceeding now to the drawings, FIGURE 1 there is illustrated therein a jet press of the horizontal type. This horizontal press comprises a pair of horizontally disposed axially aligned rams 47 and 48. The ram 47 is reciprocally mounted in supporting members 49, and the ram 48 is similarly mounted in similar supporting members 50. In order to simplify the lubrication problem, all of the supporting members 49 and 50 are provided with bearings 51 which are especially adapted for linear movement. The bearings 51 are illustrated in FIGURE 6 and are conventional in structure. Hence, this linear bearing need not be explained in detail. Each ram 47 and 48 is provided with a guide rod 52 which reciprocates through an opening 53 in one of the supporting members 49 or 50, respectively. A platen 54 is mounted upon one end of each of the rams 47 and 48 in such a manner that the platens are adapted to engage each other when the rams 47 and 48 are moved toward each other. A working surface 55 is provided directly beneath the platens 54 in order to support the object being worked.

A pair of opposed turbo jets 56 and 57 are mounted upon the ram 47. A second pair of turbo jets 58 and 59 are similarly mounted upon the ram 48. The turbo jets 56 and 57 are secured to their respective rams by means of suitable mounting structure 60. A flexible fuel line 61 of sufficient length to extend to the extreme positions of each pair of jets, leads from the mounting structures 60 to a fuel tank 62. Electric control leads 63 lead from each of the turbo jets to a control panel 64. A shield 65 is interposed between the control panel and the press in order to protect the operator against the blasts from the jets. A traveling crane 66 is provided in order to facilitate the placing and removing of the object being worked from between the platens 54.

In operation, the action of the horizontal press is similar to that of the vertical press at described above. It is pointed out, however, that there is no need for a foundation or base to absorb the thrust of the press in the work piece because by virtue of the double-ended arrangement, all of the thrust of the press is confined within itself and there are no forces, static or dynamic, transmitted to the foundation. However, in some applications it may be desirable to provide buffer springs 67 on the ram interposed between the forward supports 49 and 50 and the respective platens 54.

In order to separate the platens so as to enable the object to be worked to be positioned therebetween, the jets 56 and 58 are operated. At the end of this stroke, the jets 56 and 58 are idle and the jets 57 and 59 are operated to give the thrust to accomplish the working stroke. As described previously, the operation of these jets is preferably automatic in order that the action of the appropriate jets on each ram may take place simultaneously.

While this invention has been described in connection with both vertical and horizontal presses, it is to be understood that it may be applied to other types of apparatus which function in a similar manner. Such apparatus would comprise metal forming machines and die casting machines. In addition, plastic injection, plastic compression molding and extrusion apparatus may be equipped to function by employing the jet principle. In all these cases it can be seen that a higher speed of operation is obtained because of the ease with which the turbo jets may be controlled. It is not necessary to wait for any accumulation of hydraulic fluids or the building up of pressures, but it is only necessary to start the appropriate jet to obtain the necessary thrust to move the apparatus in the desired direction.

It is to be understood that while the jet propulsion means described in this invention have been of the turbo jet type, other types of jets could also be utilized.

For example, it would be suitable to employ in high speed presses ram jets in conjunction with turbo jets. Turbo jets, however, are preferable in that they have greater acceleration and can develop thrust in a much shorter period of time. While the conventional ram jet is capable of developing a greater amount of thrust than a similarly sized turbo jet, a longer period of time is necessary for a ram jet to accomplish this. However, depending upon the specific application of the jet principle, either the turbo jet alone or the ram jet with the turbo jet may be used to obtain the desired characteristics of the apparatus.

Thus it can be seen that this invention provides presses which are simple in construction and operation. No reaction member is required to take the reaction to the load thrust and heavy tie rods are eliminated. The presses are capable of operating at linear speed as against the sinusoidal speed of mechanical presses and are capable of higher operating speeds than hydraulic presses. This is a distinct advantage in decreasing production cost, while at the same time increasing production. Absence of reaction members and heavy tension members as well as absence of high pressure fluid tends to lighten weight and cost. The presses employ a self-contained source of power and are independent of an external supply of electric power which might be cut off at critical moments. When made with opposing pairs of jets no forces, static or dynamic, are transmitted to the foundation, which may be made light and cheap in construction, even temporary in nature.

The operation of a press, either vertical or horizontal, by reaction propulsion means, is a wholly new concept in the press art.

This application is a continuation-in-part of the copending application having the Serial Number 460,907 and filed October 7, 1954 by the same named inventor now U.S. Patent 2,905,080.

It will be understood that this invention is susceptible to modification, in order to adapt it to different usages and conditions and, accordingly, it is desired to comprehend such modifications within this invention as may fall within the scope of the appended claims.

What I claim is:

1. A press comprising, two pairs of spaced frame members in alignment with each other, a cylindrical ram reciprocably supported in each pair of frame members, platens mounted on the adjacent ends of said rams so as to engage each other in pressing engagement, a pair of jet means mounted on each of said rams, one of each pair of jet means being operable to drive the rams away from each other and the other of said jet means being adapted to drive said rams toward each other, and means for supplying fuel to said jet means for operating the same.

2. A press comprising guide means, a pair of axially aligned rams reciprocably mounted therein, platens on the adjacent ends of said rams, cushion means on said guide means to absorb the impacts of the rams at the ends of the return strokes thereof, opposed jet means mounted on each of said rams to provide the power for operating said rams in both directions, and means to operate said jet means so that thrust is alternately delivered in opposite directions to reciprocate said rams.

3. A press comprising guide means, a pair of axially aligned rams reciprocably mounted therein, platens on the adjacent ends of said rams, cushion means on said guide means to absorb the impacts of the rams at the ends of the return strokes thereof, opposed jet means mounted adjacent each other on each of said rams to provide the power for operating said rams in both directions, and means to operate said jet means so that thrust is alternately delivered in opposite directions to reciprocate said rams.

4. A press comprising guide means, a pair of axially aligned rams reciprocably mounted therein, platens on the adjacent ends of said rams, cushion means on said guide means to absorb the impacts of the rams at the ends of the return strokes thereof, opposed turbo jet units mounted on each of said rams to provide the power for operating said rams in both directions, and means to operate said jet means so that thrust is alternately delivered in opposite directions to reciprocate said rams.

5. In a jet-operated press, a pair of axially aligned horizontally disposed rams, and opposed jet propulsion means mounted adjacent each other on each of said rams.

6. In a jet-operated press, a pair of horizontal reciprocating rams arranged to oppose each other and adapted to cooperate with each other, and opposed jet propulsion means mounted adjacent each other on each ram.

7. In a press having horizontally disposed axially aligned reciprocating rams adapted to cooperate with each other, jet propulsion means mounted on each ram as a source of power for reciprocating said rams.

8. A press comprising support members, a horizontally disposed ram reciprocally mounted therein, a guide on one end of said ram, a second set of support members, a second horizontally disposed ram reciprocally mounted in said second set of support members, said second ram being axially aligned with said first ram, a platen on one end of said second ram to cooperate with the platen on said first ram, and opposed jet propulsion means mounted upon each of said rams.

9. A press as recited in claim 8 with said jet propulsion means comprising turbo jets.

10. A press comprising support members, a horizontally disposed ram reciprocally mounted therein, a platen on one end of said ram, a second set of support members, a second horizontally disposed ram reciprocally mounted in said second set of support members, said second ram being axially aligned with said first ram, a platen on one end of said second ram to cooperate with the platen on said first ram, opposed jet propulsion means mounted upon each of said rams, and means to initiate the operation of the jet propulsion means in a predetermined manner.

11. In a press having jet actuated means for operating said press, said jet means comprising two opposed pairs of jets for actuating said press.

12. In combination, a press comprising support members and guide means spaced horizontally thereof, a horizontally disposed first ram reciprocably mounted on said guide means, a second ram axially aligned with said first ram and reciprocably mounted on said guide means, opposed jet propulsion means mounted upon each of said rams to provide the power for operating each ram, and means to initiate the operation of the jet propulsion means in a predetermined manner.

13. In a press having a pair of aligned reciprocable rams and including jet actuated means for operating said press, said jet means comprising two opposed pairs of jets for actuating said press.

References Cited in the file of this patent

UNITED STATES PATENTS

| | | |
|---|---|---|
| 2,229,900 | Reitz | Jan. 28, 1941 |
| 2,422,744 | O'Neil | June 24, 1947 |
| 2,560,906 | Thyen | July 17, 1951 |
| 2,628,473 | Frye | Feb. 17, 1953 |
| 2,633,094 | Muller | Mar. 31, 1953 |
| 2,905,080 | Toulmin | Sept. 22, 1959 |

OTHER REFERENCES

Popular Mechanics, September 1948, pages 102–107.